US006864345B2

(12) United States Patent
Reimann

(10) Patent No.: US 6,864,345 B2

(45) Date of Patent: Mar. 8, 2005

(54) PROCESS AND APPARATUS FOR PRODUCING POLYETHYLENE TEREPHTHALATE

(75) Inventor: Randolf Reimann, Alzenau (DE)

(73) Assignee: Zimmer AG, Frankfurt am Main (DE)

( * ) Notice: Subject to any disclaimer, the term of this patent is extended or adjusted under 35 U.S.C. 154(b) by 0 days.

(21) Appl. No.: 10/477,796

(22) PCT Filed: Apr. 30, 2002

(86) PCT No.: PCT/EP02/04740

§ 371 (c)(1), (2), (4) Date: Apr. 23, 2004

(87) PCT Pub. No.: WO02/096531

PCT Pub. Date: Dec. 5, 2002

(65) Prior Publication Data

US 2004/0171789 A1 Sep. 2, 2004

(30) Foreign Application Priority Data

May 25, 2001 (DE) ........................................ 101 25 678

(51) Int. Cl.[7] ................................................ C08G 63/00

(52) U.S. Cl. ......................... 528/196; 526/65; 528/271; 528/272; 528/274; 528/483

(58) Field of Search ........................... 526/65; 528/271, 528/272, 274, 483

(56) References Cited

U.S. PATENT DOCUMENTS

| | | | | |
|---|---|---|---|---|
| 3,109,834 A | | 11/1963 | Seiner et al. | |
| 3,469,618 A | * | 9/1969 | Siclari et al. | 159/48.2 |
| 3,545,520 A | * | 12/1970 | Siclari et al. | 159/4.04 |
| 4,146,729 A | | 3/1979 | Shiffler et al. | |
| 4,758,650 A | | 7/1988 | Schulz | |
| 5,059,288 A | | 10/1991 | Curry | |
| 5,236,558 A | | 8/1993 | Buyalos et al. | |
| 5,434,239 A | * | 7/1995 | Bhatia | 528/274 |
| 5,451,300 A | | 9/1995 | Matros et al. | |
| 5,562,834 A | | 10/1996 | Bremer et al. | |

OTHER PUBLICATIONS

John Brown Deutsche Engineering, PET Resin Technology and Products, South Asia, Polyester & PET 96, Nov. 20 and 21, 1996, Mumbai, Indai.

* cited by examiner

*Primary Examiner*—Terressa Boykin

(74) *Attorney, Agent, or Firm*—Norris McLaughlin & Marcus PA

(57) ABSTRACT

In a process of producing polyethylene terephthalate by esterification of terephthalic acid with ethylene glycol and polycondensation, the vapors formed are rectified, the liquid phase is recirculated to the process, and the lower-boiling components are condensed. To obtain an almost completely stripped condensate, condensate is circulated and stripped the same with air, and the exhaust air is subjected to a catalytic oxidation.

8 Claims, 1 Drawing Sheet

PROCESS AND APPARATUS FOR PRODUCING POLYETHYLENE TEREPHTHALATE

This is a 371 of PCT/EP02/104740 filed Apr. 30, 2002.

This invention relates to a process and an apparatus for the continuous production of polyethylene terephthalate (PET), wherein pure terephthalic acid is esterified with ethylene glycol, then prepolycondensated and subsequently polycondensated, the vapors formed being rectified, the liquid phase substantially consisting of ethylene glycol being recirculated to the production process, and the vapor phase containing the lower-boiling components water, acetaldehyde, 2-methyl-1,3-dioxolane, 1,4-dioxane and possibly acetic acid being condensed.

BACKGROUND OF THE INVENTION

For the continuous production of PET, terephthalic acid is used as raw material. The essential process steps include the preparation of the raw materials, the esterification, the prepolycondensation and the polycondensation. In detail, terephthalic acid is mixed with ethylene glycol and a catalyst to obtain a paste and is then supplied to the esterification. Esterification is effected at atmospheric pressure by removing water. Prepolycondensation is effected under a vacuum. Polycondensation is performed at an elevated temperature and under an increased vacuum. The vapors containing water, acetaldehyde, 2-methyl-1,3-dioxolane, 1,4-dioxane and—in dependence on the catalyst used—acetic acid, which are formed in this process, are rectified, the ethylene glycol obtained as bottom product is recirculated to the esterification stage, and the lower-boiling components are discharged as top product and condensed. Due to the lower-boiling 2-methyl-1,3-dioxolane, which is formed in the production of PET from acetaldehyde and ethylene glycol by removing water, relatively large amounts of ethylene glycol are discharged indirectly in the top product. In the presence of an excess of water, the 2-methyl-1,3-dioxolane is again decomposed in dependence on the temperature, the pH-value and the reaction time to obtain the starting components acetaldehyde and ethylene glycol.

In the production of PET, an aliquot of the vapor condensate is usually recirculated to the rectification, and the excess aliquot is stripped once by means of air, the major part of the lower-boiling components being converted to the gas phase. The vapor condensate prepurified in this way is discharged for further treatment.

The exhaust air streams obtained during the production of PET are supplied to the air blower for stripping the excess vapor condensate. The exhaust air of the stripping process, which is laden with lower-boiling components, is supplied to a heat transfer furnace for thermal combustion.

According to a lecture of John Brown Deutsche Engineering, PET Resin Technology and Products, South Asia, Polyester & PET 96, Nov. 20 and 21, 1996, Mumbai, India, the entire vapor condensate is stripped once with inert gas when producing polyethylene terephthalate. By means of a three-stage reverse osmosis, a water/ethylene glycol mixture as concentrate and water as permeate are then produced from the prepurified vapor condensate. The concentrate is recirculated to the process of producing PET, and the permeate is used as demineralized water. The exhaust air of the stripper and the exhaust air of the condensers of the process columns are combined and by means of a blower supplied to the heat transfer furnace for thermal combustion.

It is disadvantageous that in the above-described processes the composition of the exhaust air of the stripper is subject to considerable variations as a result of changing concentrations of the organic components in the vapor condensate. A buffer function does not exist. An improvement of the recovery of ethylene glycol is only possible in the case of the process of producing PET, in which the stripped prepurified vapor condensate is subjected to a triple reverse osmosis. But since sticky, oily masses frequently occur in the vapor condensate, a blocking of the membranes of the reverse osmosis takes place after some time, as is assumed. Moreover, the combustion of the exhaust air of the stripper in the heat transfer furnace provides a direct coupling of the process of producing PET with the heat transfer furnace, so that malfunctions occurring in the process have a direct influence on the operation of the heat transfer furnace, and malfunctions in the heat transfer furnace have a direct influence on the production of PET.

SUMMARY OF THE INVENTION

It is the object to develop the above-described process of producing PET such that the initial loading with organic components of the condensate formed during the rectification of the vapors is stripped to a residual loading and the condensate can thus easily be charged to a biological waste water treatment. Furthermore, there should be achieved a distinct reduction of the losses of ethylene glycol.

The solution of this object consists in that the vapor condensate is circulated and stripped at the same time and part of the stripped condensate is discharged. By circulating the vapor condensate, the range of variation of the concentration of the organic components of the vapor condensate is reduced considerably and thus evened out in the exhaust air of the stripper.

DETAILED DESCRIPTION

With a dwell time of the circulating vapor condensate in the stripping column of about 60 min, the 2-methyl-1,3-dioxolane is decomposed almost completely into its starting substances acetaldehyde and ethylene glycol, and thus ethylene glycol is recovered. Stripping the vapor condensate is expediently effected at temperatures of 45 to 70° C.

In accordance with the particular aspect of the process of the invention, the exhaust air of the stripping process, which has a high loading of organic components, is oxidized catalytically and then discharged to the atmosphere. Moreover it is also possible to catalytically oxidize exhaust air streams, which are loaded with organic ingredients as a result of the process of producing PET, along with the exhaust air of the stripping process. The advantages of the catalytic oxidation of the organically loaded exhaust air streams consist in extremely short exhaust air supply lines, in relatively low operating temperatures and in the maintenance of the usually prescribed emission limit values.

The apparatus for the catalytic oxidation of the exhaust air streams comprises a heat exchanger, in which the exhaust air having a temperature of 45 to 70° C. is heated to a temperature of 280 to 320° C., and a reactor including a catalyst, in which reactor the organic components contained in the exhaust air are oxidized for more than 99% to obtain carbon dioxide and water.

BRIEF DESCRIPTION OF THE DRAWINGS

The process in accordance with the invention is represented in the drawing by way of example as a flow diagram and will subsequently be explained in detail.

Through line (1), the vapor condensate of the stripping column (3) having a plurality of packed beds (2), which has been withdrawn at the head of a rectification column not represented here, is supplied to the upper part of said stripping column. For expelling the dissolved organic components contained in the vapor condensate, stripping air is blown into the lower part of the stripping column (3) through line (4) by means of the blower (5) and guided countercurrently with respect to the vapor condensate. The stripped vapor condensate is withdrawn at the bottom of the stripping column (3) and again charged to the upper part of the stripping column (3) through line (6) by means of the liquid pump (7). By means of the heat exchanger (8) disposed in line (6), the temperature of the circulating stripped vapor condensate is adjusted to the desired value. An aliquot of the stripped vapor condensate is withdrawn from line (6) through line (9) and supplied to the rectification column as reflux. Furthermore, excess stripped vapor condensate is discharged from line (6) through line (10) and upon flowing through the cooler (11) supplied to a further treatment. Smaller exhaust air streams obtained in the plant for producing polyethylene terephthalate are combined and through line (12) added to the stripping air flowing in line (4). The exhaust air streams of vacuum pumps and of the condenser of the rectification column are sucked in by means of the blower (13) and through line (14) combined with the exhaust air of the stripping column flowing in line (15). This exhaust air containing organic components and having a temperature of about 60° C. is supplied to a heat exchanger (18) by adding fresh air blown in through line (16) by means of the blower (17) and is heated to a temperature of about 300° C. Upon flowing through a start-up heater (19), the laden exhaust air is supplied to the oxidation plant (20), in which the organic components contained in the exhaust air are oxidized for more than 99% to obtain carbon dioxide and water. Through line (21), the purified exhaust air having an average temperature of 500° C. leaves the oxidation plant (20), flows through the heat exchanger (18), in which the temperature is reduced to about 250° C., and is discharged to the atmosphere through the chimney (22). The purified exhaust air only contains trace amounts of organic ingredients.

EMBODIMENT

Figure 1:
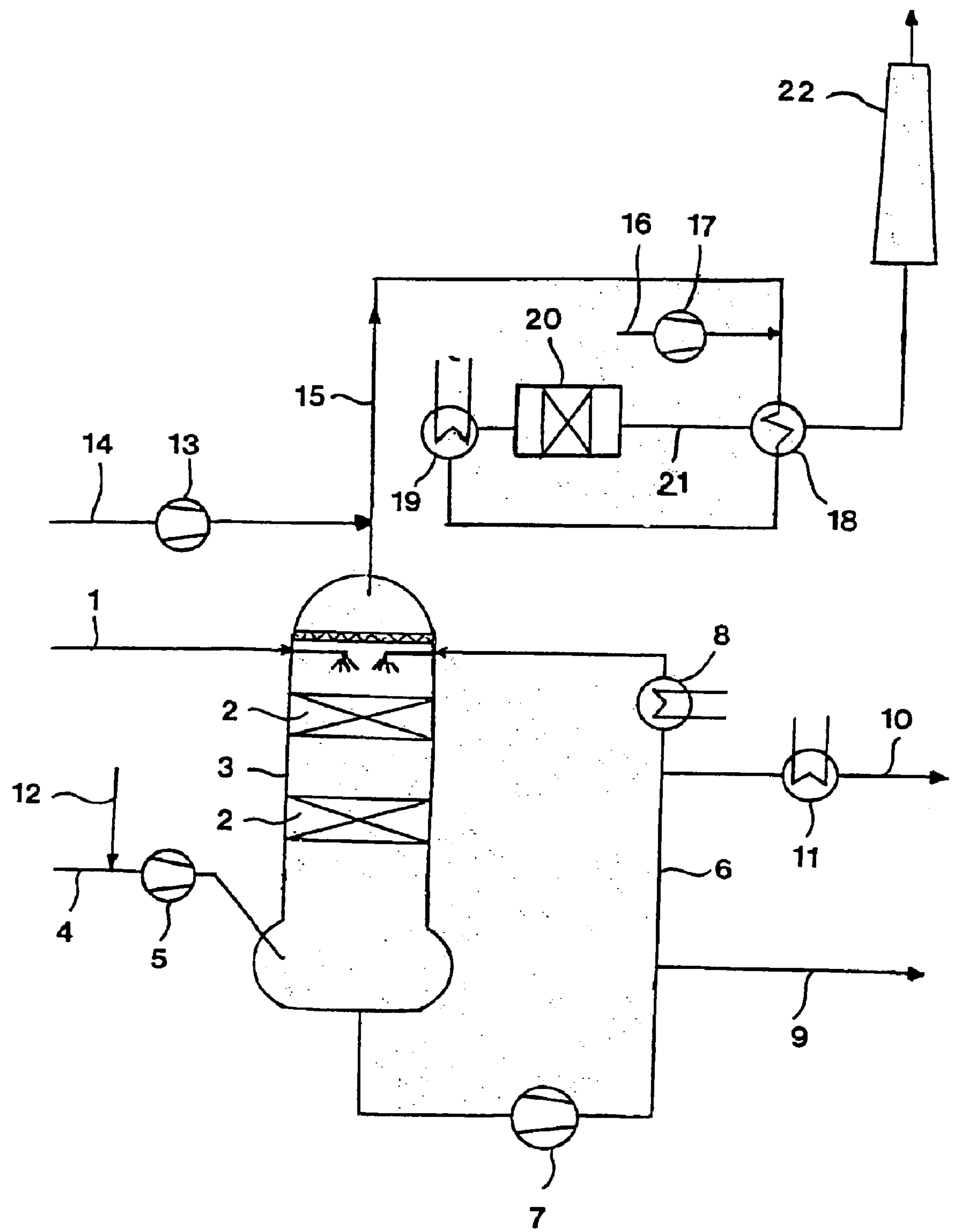

In the production of 300 t PET/day, 5.75 $m^3$/h vapor condensate from the rectification column are charged to the stripping column (3) through line (1) with a temperature of 93° C. The vapor condensate comprises:

| | |
|---|---|
| 5.0 g/l | acetaldehyde |
| 1.8 g/l | methyl dioxolane |
| 4.0 g/l | ethylene glycol |
| 0.4 g/l | 1,4-dioxane |
| 0.8 g/l | acetic acid, rest water |

The exhaust air having a temperature of 64° C., which flows out of the stripping column (3) charged with 1813 kg/h fresh air through line (4), is combined with the exhaust air stream having a temperature of 53° C., which originates from other sources and is sucked in through line (14), and which contains

| | |
|---|---|
| 50.00 kg/h | nitrogen |
| 2.50 kg/h | acetaldehyde |
| 1.88 kg/h | methyl dioxolane, and |
| 0.63 kg/h | ethylene glycol. |

The total exhaust air stream, comprising

| | |
|---|---|
| 1813.00 kg/h | air |
| 276.00 kg/h | water |
| 32.50 kg/h | acetaldehyde |
| 1.25 kg/h | 1,4-dioxane |
| 1.25 kg/h | acetic acid |

flows through line (15) and the oxidation plant (20) to the chimney (22). The exhaust air discharged to the atmosphere only contains 5 mg/$Nm^3$ organic carbon (TA air≦20 mg/$Nm^3$), 1 mg/$Nm^3$ carbon monoxide (TA air≦100 mg/$Nm^3$) and 2 mg/$Nm^3$ nitrogen oxides (TA air≦200 mg/$Nm^3$), so that the emissions contained in the exhaust air clearly lie far below the specified emission limit values of the TA air. TA air means "Technische Anleitung zur Reinhaltung der Luft" (technical instructions for the prevention of air pollution) and constitutes an administrative regulation of the "Bundesimmissionsschutzgesetz" (Federal Immission Protection Act) in the version of Feb. 27, 1986, which contains emission and immission limit values.

2.25 $m^3$/h of the stripped vapor condensate flowing out at the bottom of the stripping column (3) are discharged from the plant for producing PET through line (10), and 3.22 $m^3$/h are supplied as reflux to the rectification column through line (9). The stripped vapor condensate still contains

| | |
|---|---|
| 0.1 g/l | acetaldehyde |
| n.n. | methyl dioxolane |
| 3.5 g/l | ethylene glycol |
| 0.3 g/l | 1,4-dioxane |
| 0.7 g/l | acetic acid |

The stripped vapor condensate can be processed in a biological processing plant and only has a negligeable toxic effect.

What is claimed is:

1. A process for the continuous production of polyethylene terephthalate, in which terephthalic acid is esterified with ethylene glycol, thereafter prepolycondensated and subsequently polycondensated, the vapors formed being rectified, the liquid phase substantially consisting of ethylene glycol being recirculated to the production process, and the vapor phase containing the lower-boiling components acetaldehyde, 2-methyl-1,3-dioxolane, 1,4-dioxane and which also may contain acetic acid being condensed, wherein the vapor condensate is circulated, stripped with air, and an aliquot of the stripped vapor condensate is discharged.

2. The process as claimed in claim 1, wherein an aliquot of the stripped vapor condensate is supplied as reflux to the rectification.

3. The process as claimed in claim 1, wherein the dwell time of the vapor condensate in the stripper is about 60 min.

4. The process as claimed in claim 1, wherein the vapor condensate is stripped at temperatures of 45 to 70° C.

5. The process as claimed in claim 1, wherein the exhaust air of the stripping process, which is laden with the lower-boiling components, including acetaldehyde, is subjected to a catalytic oxidation.

6. The process as claimed in claim 1, wherein process exhaust air laden with organic components, including acetaldehyde and 2-methyl-1,3-dioxalane, is combined with the exhaust air of the stripping process.

7. The process as claimed in claim 1, wherein the reflux of the stripping process is guided cocurrently with respect to the inflow of the vapor condensate.

8. An apparatus for performing the process as claimed in any of claims 1 to 7, wherein a heat exchanger, through which the laden exhaust air of the stripping process can flow, and a reactor including a catalyst for the catalytic oxidation of the exhaust air laden with organic components.

* * * * *